Patented May 16, 1939

2,158,138

UNITED STATES PATENT OFFICE 2,158,138

PROCESS OF MAKING RUBBER DERIVATIVES

John McGavack, Leonia, N. J., assignor, by mesne assignments, to United States Rubber Company, New York, N. Y., a corporation of New Jersey No Drawing. Application January 7, 1937, Serial No. 119,453

10 Claims. (Cl. 260—111)

This invention relates to processes of making rubber derivatives and more particularly to hydrohalogen rubber-terpene products.

An object of the invention is to prepare rubber hydrochloride products having superior resistance to the deteriorating influences of light and air. A further object is to provide an improved process of preparing such a product. Other objects will be apparent from the description below.

According to the invention rubber is converted to the hydrochloride by reaction with hydrogen chloride while the rubber is intimately associated with a terpene, common known as an unsaturated hydrocarbon of the general formula $C_{10}H_{16}$. The terpene may occur as such or as a component of an ethereal oil such as turpentine. The reaction is preferably carried out while the rubber is dissolved in an organic solvent. Any of the known processes of hydrochlorination may be used, the time, rate and temperature of reaction being chosen to allow thorough contact of the hydrogen chloride with both the rubber and the terpene. According to the reaction both the rubber and the terpene combine with the hydrogen chloride.

Various types of rubber, purified and unpurified, may be used, such as deresinated or deproteinized rubbers, pale crepe, smoked sheet, etc. The more purified the rubber the clearer and more transparent will be the resulting films when cast or applied to any body.

The proportion of the terpene may vary from about 1% to about 100% based on the rubber, and preferably on the order of about 15% to about 35% by weight based on the rubber. The composite product may contain from about 26% to about 30% combined chlorine. The product is slightly elastic and resilient and forms tough flexible sheets. When cast in the form of thin films it may be used for various purposes, such as lamp shades, drapes, wrapping paper, etc. Solutions of the composite product may also be used for coating paper, textile materials, etc.

The following examples are given to illustrate the invention, the parts being by weight:

Example 1

Anhydrous hydrogen chloride is introduced into a mix of 55.2 parts of rubber (pale crepe), 23.7 parts of turpentine and 1004 parts of chloroform (rubber solvent) for about 24 hours. Excess hydrogen chloride may be removed by air blowing or by neutralization with alkali. The solution when cast on a removable base forms a film containing about 28% combined chlorine. This film can be stored for 6 months or more while subjected to light and air without undergoing brittlization. It will remain tough and flexible.

Example 2

Anhydrous hydrogen chloride is introduced into a mix of 27.6 parts of rubber (pale crepe), 2.76 parts of turpentine and 530 parts of chloroform (rubber solvent) for about 12 hours. Excess hydrogen chloride may be removed by air blowing. The solution is cast into a thin sheet of about .009". It forms a transparent flexible sheet having a tensile of about 4500 pounds per square inch and a stretch of approximately 6%, and contains about 28.7% chlorine.

Turpentine is essentially pinene. Pinene reacts with hydrogen chloride, forming a monohydrochloride containing approximately 21% chlorine. Instead of pinene, other terpenes may be used in the reaction, particularly those set forth in Bradley and McGavack U. S. Patent 1,519,659. If desired, the composite product may have incorporated therein stabilizing agents such as those set forth in U. S. Patents 1,519,659, 1,989,632 and 2,046,987, although they are not necessary. Also other compounding and filling agents, etc. may be incorporated whereby to render the product suitable to the desired ultimate use.

The term "rubber" herein is to be construed broadly as including caoutchouc and allied gums reactive to hydrogenchloride, as well as reclaimed and scrap rubbers.

Having thus described my invention, what I claim and desire to protect by Letters Patent is:

1. A process which comprises subjecting a homogeneous mix of rubber and a terpene to the action of a hydrogen halide.

2. A process which comprises introducing hydrogen chloride into an organic solvent solution of rubber and a terpene and hydrochlorinating the rubber and the terpene.

3. A process which comprises introducing hydrogen chloride into an organic solvent solution of rubber and a terpene, hydrochlorinating the rubber and the terpene, and subsequently removing the organic solvent.

4. A process which comprises introducing hydrogen chloride into an organic solvent solution of rubber and a terpene, hydrochlorinating the rubber and the terpene, and subsequently casting the solution on a base and removing the organic solvent.

5. The product of reaction of hydrogen chloride on a homogeneous mix of rubber and a terpene.

6. The product of reaction of hydrogen chloride on a homogeneous mix of rubber and pinene.

7. The product of reaction of hydrogen chloride on a homogeneous mix of rubber and an ethereal oil containing a terpene.

8. The product of reaction of hydrogen chloride on a homogeneous mix of rubber and turpentine.

9. A composition of matter comprising a homogeneous blend of rubber hydrochloride and a terpene hydrochloride.

10. A thin flexible sheet material or film comprising a homogeneous blend of a rubber hydrochloride compound and a terpene hydrochloride.

JOHN McGAVACK.